US012621234B2

(12) United States Patent
Banka et al.

(10) Patent No.: US 12,621,234 B2
(45) Date of Patent: May 5, 2026

(54) DISTRIBUTED APPLICATION CALL PATH PERFORMANCE ANALYSIS

(71) Applicant: Juniper Networks, Inc., Sunnyvale, CA (US)

(72) Inventors: Tarun Banka, Milpitas, CA (US); Rahul Gupta, Kanpur (IN); Mithun Chakaravarrti Dharmaraj, Mountain View, CA (US); Amandeep Chauhan, Sunnyvale, CA (US); Thayumanavan Sridhar, Sunnyvale, CA (US); Raj Yavatkar, Los Gatos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 131 days.

(21) Appl. No.: 18/478,260

(22) Filed: Sep. 29, 2023

(65) Prior Publication Data

US 2025/0112851 A1      Apr. 3, 2025

(51) Int. Cl.
*H04L 45/12* (2022.01)
*H04L 41/0816* (2022.01)
(Continued)

(52) U.S. Cl.
CPC ........ *H04L 45/123* (2013.01); *H04L 41/0816* (2013.01); *H04L 43/16* (2013.01); *H04L 45/38* (2013.01)

(58) Field of Classification Search
CPC ... H04L 41/0816; H04L 43/16; H04L 45/123; H04L 45/38
See application file for complete search history.

(56) References Cited

U.S. PATENT DOCUMENTS 9,571,394 B1    2/2017  Sivaramakrishnan et al.
9,998,562 B1*   6/2018  Peterson ................. H04L 67/60
(Continued)

FOREIGN PATENT DOCUMENTS

CN      117061507 A   * 11/2023  ............. H04L 67/10
WO      2013184846 A1   12/2013

OTHER PUBLICATIONS

Chunming Hu et al. "TOPOSCH: Latency-Aware Scheduling Based on Critical Path Analysis on Shared YARN Clusters", 2020 IEEE 13th International Conference on Cloud Computing (CLOUD), 9 pages. (Year: 2020).*
(Continued)

*Primary Examiner* — G. C. Neurauter, Jr.
(74) *Attorney, Agent, or Firm* — Shumaker & Sieffert P.A.

(57)      ABSTRACT

In general, techniques are described for managing a distributed application based on call paths among the multiple services of the distributed application that traverse underlying network infrastructure. In an example, a method comprises determining, by a computing system, and for a distributed application implemented with a plurality of services, a call path from an entry endpoint service of the plurality of services to a terminating endpoint service of the plurality of services; determining, by the computing system, a corresponding network path for each pair of adjacent services from a plurality of pairs of services that communicate for the call path; and based on a performance indicator for a network device of the corresponding network path meeting a threshold, performing, by the computing system, one or more of: reconfiguring the network; or redeploying one of the plurality of services to a different compute node of the compute nodes.

20 Claims, 7 Drawing Sheets

(51) Int. Cl.
    *H04L 43/16*        (2022.01)
    *H04L 45/00*        (2022.01)

(56)             References Cited

U.S. PATENT DOCUMENTS

| | | | | |
|---|---|---|---|---|
| 10,523,507 | B2 * | 12/2019 | Toledo | H04L 43/0882 |
| 10,708,082 | B1 | 7/2020 | Bakiaraj et al. | |
| 10,728,145 | B2 | 7/2020 | Rao et al. | |
| 10,860,390 | B2 * | 12/2020 | Sukhomlinov | G06F 9/5038 |
| 11,381,474 | B1 | 7/2022 | Kumar et al. | |
| 11,469,983 | B1 * | 10/2022 | Malov | H04L 41/142 |
| 11,575,572 | B2 | 2/2023 | Nagaprakash et al. | |
| 11,743,281 | B1 * | 8/2023 | Behl | H04L 41/16 |
| | | | | 726/22 |
| 12,174,692 | B1 * | 12/2024 | Ray | G06F 11/076 |
| 2005/0010608 | A1 | 1/2005 | Horikawa | |
| 2015/0288592 | A1 | 10/2015 | Baughman et al. | |
| 2021/0112017 | A1 | 4/2021 | Gupta et al. | |
| 2021/0320853 | A1 | 10/2021 | Kulshreshtha et al. | |
| 2022/0158926 | A1 | 5/2022 | Wennersrom et al. | |
| 2022/0172037 | A1 * | 6/2022 | Kang | G06N 3/044 |
| 2023/0072358 | A1 | 3/2023 | Baillargeon | |
| 2023/0125661 | A1 | 4/2023 | Jebakumar et al. | |
| 2023/0198867 | A1 | 6/2023 | Palladino et al. | |
| 2025/0023772 | A1 * | 1/2025 | Juneja | H04L 41/40 |

OTHER PUBLICATIONS

PIGRAM86, "Improving Kubernetes Scheduler Performance", Cloudy Journey, Feb. 23, 2016, 6 pp., URL: https://www.toddpigram.com/2016/02/improving-kubernetes-scheduler.html.

"Telemetry Aware Scheduling (TAS)—Automated Workload Optimization with Kubernetes (K8s*) Technology Guide", Technology Guide, Intel Corporation, https://builders.intel.com/docs/networkbuilders/telemetry-aware-scheduling-automated-workload-optimization-with-kubernetes-k8s-technology-guide.pdf, Apr. 16, 2020, 11 pp.

Apostolopoulos, "Cloud-Native SD-WAN: The WAN Your Kubernetes Applications Deserve", Cisco, Aug. 20, 2020, 9 pp.

Behara, "Istio Circuit Breaker With Outlier Detection", https://dzone.com/articles/istio-circuit-breaker-with-outlier-detection, Jun. 10, 2019, 4 pp.

Berner et al., "Scaling Kubernetes to 2,500 nodes", OpenAI, Jan. 18, 2018, 14 pp., URL: https://openai.com/research/scaling-kubernetes-to-2500-nodes.

Docker et al., "Docker overview", Docker Docs, 5 pp., Retrieved from the Internet on Jan. 10, 2024 from URL: https://docs.docker.com/get-started/overview/.

Garcia et al., "prometheus-kafka-adapter", Github, Sep. 30, 2018, 5 pp., Retrieved from the Internet on Jan. 10, 2024 from URL: https://github.com/Telefonica/prometheus-kafka-adapter.

Intel Corporation, "Simplify Your AI Efforts with Ready-Right-Now Solutions", 6 pp., Retrieved from the Internet on Jan. 10, 2024 from URL: https://www.intel.com/content/www/us/en/partner-alliance/membership/benefits/partners-ai.html.

Mackie et al., "BGP-Signaled End-System IP/VPNs", Internet-Draft, Network Working Group, Dec. 15, 2016, 61 pp.

Santos et al., "Towards delay-aware container-based Service Function Chaining in Fog Computing", NOMS 2020—2020 IEEE/IFIP Network Operations and Management Symposium, Jun. 8, 2020, 9 pp.

Santos et al., "Towards Network-Aware Resource Provisioning in Kubernetes for Fog Computing Applications", 2019 IEEE Conference on Network Softwarization (NetSoft), Aug. 22, 2019, 9 pp.

Tetrate et al., "Simplify Kubernetes and Multi-Cloud Complexity with the Service Mesh", Oct. 16, 2023, 13 pp., URL: https://7637559.fs1.hubspotusercontent-na1.net/hubfs/7637559/Resources%20and%20PDFs/White%20Papers/Simplify%20Kubernetes%20and%20Multi-Cloud%20Complexity%20with%20the%20Service%20Mesh.pdf.

U.S. Appl. No. 18/325,760, filed May 30, 2023, naming inventors Banka et al.

Xin et al., "Topology-Aware Scheduling Framework for Microservice Applications in Cloud", IEEE Transactions on Parallel and Distributed Systems,, vol. 34, No. 5, Jan. 23, 2023, pp. 1635-1649.

Extended Search Report from counterpart European Application No. 24202354.7 dated Mar. 12, 2025, 9 pp.

Mohammed et al., "SDN controller for network-aware adaptive orchestration in dynamic service chaining", IEEE NetSoft Conference and Workshops (NetSoft), IEEE, Jun. 6, 2016, 126-130 pp.

Response to Extended Search Report dated Mar. 12, 2025, from counterpart European Application No. 24202354.7 filed Oct. 3, 2025, 23 pp.

* cited by examiner

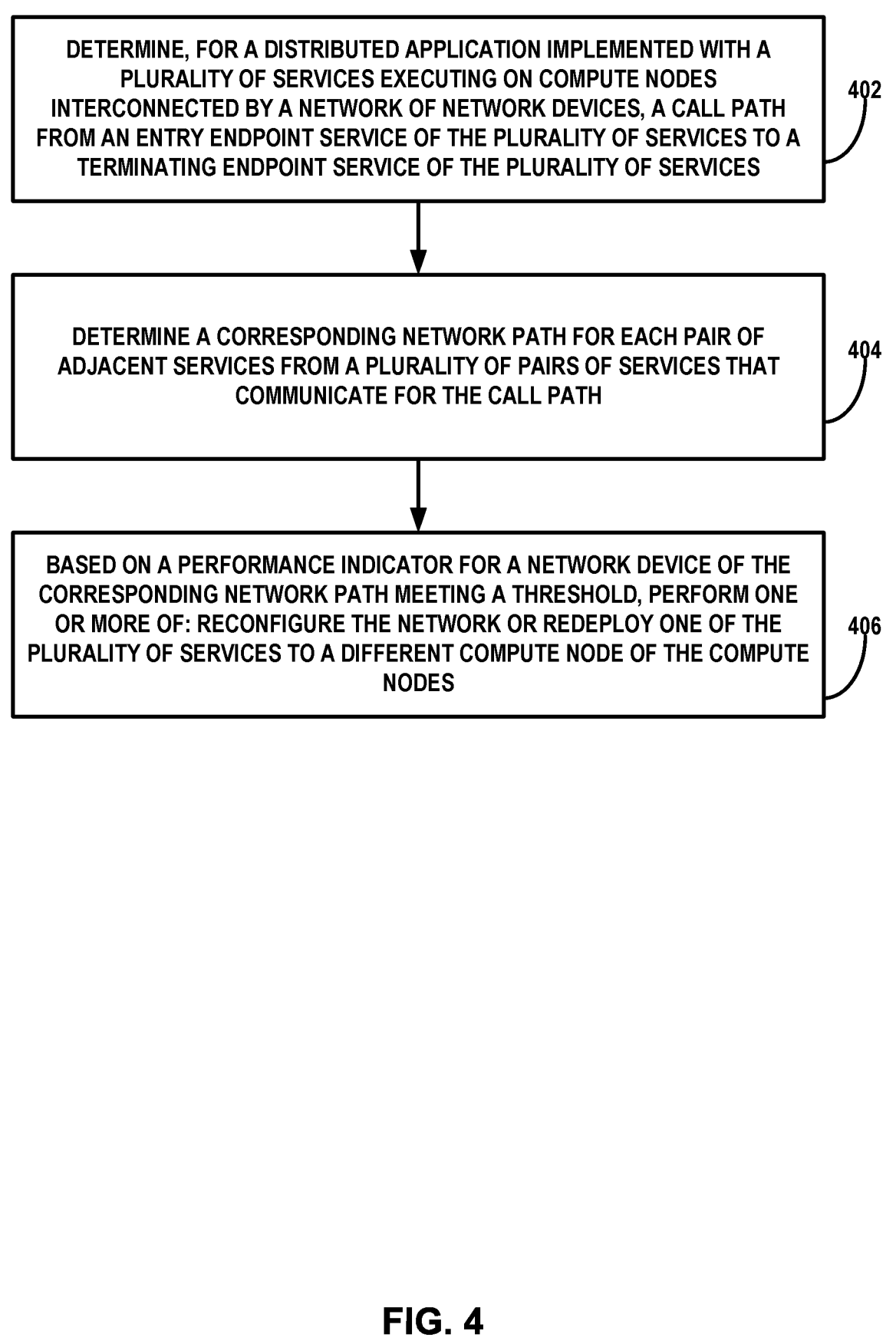

DETERMINE, FOR A DISTRIBUTED APPLICATION IMPLEMENTED WITH A PLURALITY OF SERVICES EXECUTING ON COMPUTE NODES INTERCONNECTED BY A NETWORK OF NETWORK DEVICES, A CALL PATH FROM AN ENTRY ENDPOINT SERVICE OF THE PLURALITY OF SERVICES TO A TERMINATING ENDPOINT SERVICE OF THE PLURALITY OF SERVICES — 402

DETERMINE A CORRESPONDING NETWORK PATH FOR EACH PAIR OF ADJACENT SERVICES FROM A PLURALITY OF PAIRS OF SERVICES THAT COMMUNICATE FOR THE CALL PATH — 404

BASED ON A PERFORMANCE INDICATOR FOR A NETWORK DEVICE OF THE CORRESPONDING NETWORK PATH MEETING A THRESHOLD, PERFORM ONE OR MORE OF: RECONFIGURE THE NETWORK OR REDEPLOY ONE OF THE PLURALITY OF SERVICES TO A DIFFERENT COMPUTE NODE OF THE COMPUTE NODES — 406

FIG. 4

DETERMINE APPLICATION CALL TRACES FOR GIVEN TIME WINDOW 502

DETERMINE APPLICATION CRITICAL PATH 504

DETERMINE SET OF REMOTE PROCEDURE CALL (RPC) SOURCE AND DESTINATION IP PAIRS 506

DETERMINE SET OF NETWORK DEVICES THAT HAVE PROCESSED FLOWS FOR THE RPC CALLS 508

DETERMINE SET OF POSSIBLE PATHS FOR RPC CALLS USING DEPENDENCY GRAPH INFORMATION 510

DISTRIBUTED APPLICATION CALL PATH PERFORMANCE ANALYSIS

TECHNICAL FIELD

The disclosure relates to computing systems and, more specifically, to managing distributed applications operating over a network.

BACKGROUND

Computer networks have become ubiquitous and the number of network applications, network-connected devices, and types of network-connected devices are rapidly expanding. Such devices now include computers, smart phones, Internet-of-Things (IoT) devices, cars, medical devices factory equipment, etc. An end-user network-connected device typically cannot directly access a public network such as the Internet. Instead, an end-user network device establishes a network connection with an access network, and the access network communicates with a core network that is connected to one or more packet data networks (PDNs) offering services. There are several different types of access networks currently in use. Examples include Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The core network may be that of a mobile service provider network, such as a 3G, 4G/LTE, or 5G network.

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements or workloads, such virtual machines or containers, are deployed and executed on an underlying compute platform of physical computing devices. Workloads may also include bare metal processes.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical central processing unit (CPU), virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise information technology (IT) staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable workloads for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). These systems are characterized by being dynamic and ephemeral, as hosted services can be quickly scaled up or adapted to new requirements. Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual computing instances, such as containers or VMs, as well as among applications running on legacy (e.g., physical) environments. Software-defined networking contributes to network management.

SUMMARY

In general, techniques are described for managing a distributed application based on call paths among the multiple services of the distributed application that traverse underlying network infrastructure. Services of a distributed application call other services and form a chain of calls from an entry endpoint service to a terminating endpoint service. Such an end-to-end chain of calls is referred to as a call path, and the call path that contributes towards maximum latency for the end-to-end behavior is a critical path for the distributed application. For each pair of services along a call path, there is a corresponding network path for the call path between the pair of services.

In an example of the described techniques, an analytics system processes telemetry data obtained from compute nodes executing the services and network flow data obtained from network devices. The analytics system processes the telemetry data and network flow data to identify a network path for each pair of adjacent services of the services that communicate for a call path. Network devices that process service traffic, including service calls, for a call path can exhibit degraded performance, such as increased latency, reduced transmission speed, reduced data throughput, dropped packets, and other impacts to the performance and functionality of the network device as it affects service traffic. A network device exhibiting degraded performance may impact service traffic between pairs of services and, by extension, impact the end-to-end performance of the distributed application along a call path. If the analytics system determines that a network device along a network path is experiencing degraded performance, the analytics system may reconfigure the network or direct a scheduler, such as a Kubernetes scheduler, to modify the deployment of services for the distributed application.

The techniques of this disclosure may provide one or more technical advantages that can realize one or more practical applications. Prior solutions for analyzing the effect of network performance degradation on distributed applications attempt to trace the effect of a degraded network device to distributed application services. By contrast, an analytics system applying techniques described herein identifies end-to-end call paths and correlates these paths to the underlying network paths. The critical path for a distributed application, by virtue of its contribution to application latency, may itself be an indicator of a network performance issue. By focusing the analysis on certain call paths in an application-aware manner, the analytics system can focus network analysis to components of the network that contribute to application latency and may more quickly and reliably identify and ameliorate negative impacts to application performance.

In one example, this disclosure describes a method comprising determining, by a computing system, for a distributed application implemented with a plurality of services executing on compute nodes interconnected by a network of network devices, a call path from an entry endpoint service of the plurality of services to a terminating endpoint service of the plurality of services; determining, by the computing system, a corresponding network path for each pair of adjacent services from a plurality of pairs of services that communicate for the call path; and based on a performance indicator for a network device of the corresponding network path meeting a threshold, performing, by the computing system, one or more of reconfiguring the network; or redeploying one of the plurality of services to a different compute node of the compute nodes.

In another example, this disclosure describes a computing system comprising memory; and processing circuitry in communication with the memory, and configured to determine, for a distributed application implemented with a plurality of services executing on compute nodes interconnected by a network of network devices, a call path from an entry endpoint service of the plurality of services to a terminating endpoint service of the plurality of services determine a corresponding network path for each pair of adjacent services from a plurality of pairs of services that communicate for the call path; and based on a performance indicator for a network device of the corresponding network path meeting a threshold, perform one or more of reconfigure the network; or redeploy one of the plurality of services to a different compute node of the compute nodes.

In another example, this disclosure describes non-transitory computer-readable storage media comprising instructions that, when executed, cause one or more processors to determine, for a distributed application implemented with a plurality of services executing on compute nodes interconnected by a network of network devices, a call path from an entry endpoint service of the plurality of services to a terminating endpoint service of the plurality of services; determine a corresponding network path for each pair of adjacent services from a plurality of pairs of services that communicate for the call path; and based on a performance indicator for a network device of the corresponding network path meeting a threshold, perform one or more of reconfigure the network; or redeploy one of the plurality of services to a different compute node of the compute nodes.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 4 is a flowchart illustrating an example operation of the computing system in accordance with one or more techniques of this disclosure.

Like reference characters denote like elements throughout the description and figures.

DETAILED DESCRIPTION

Figure 1:
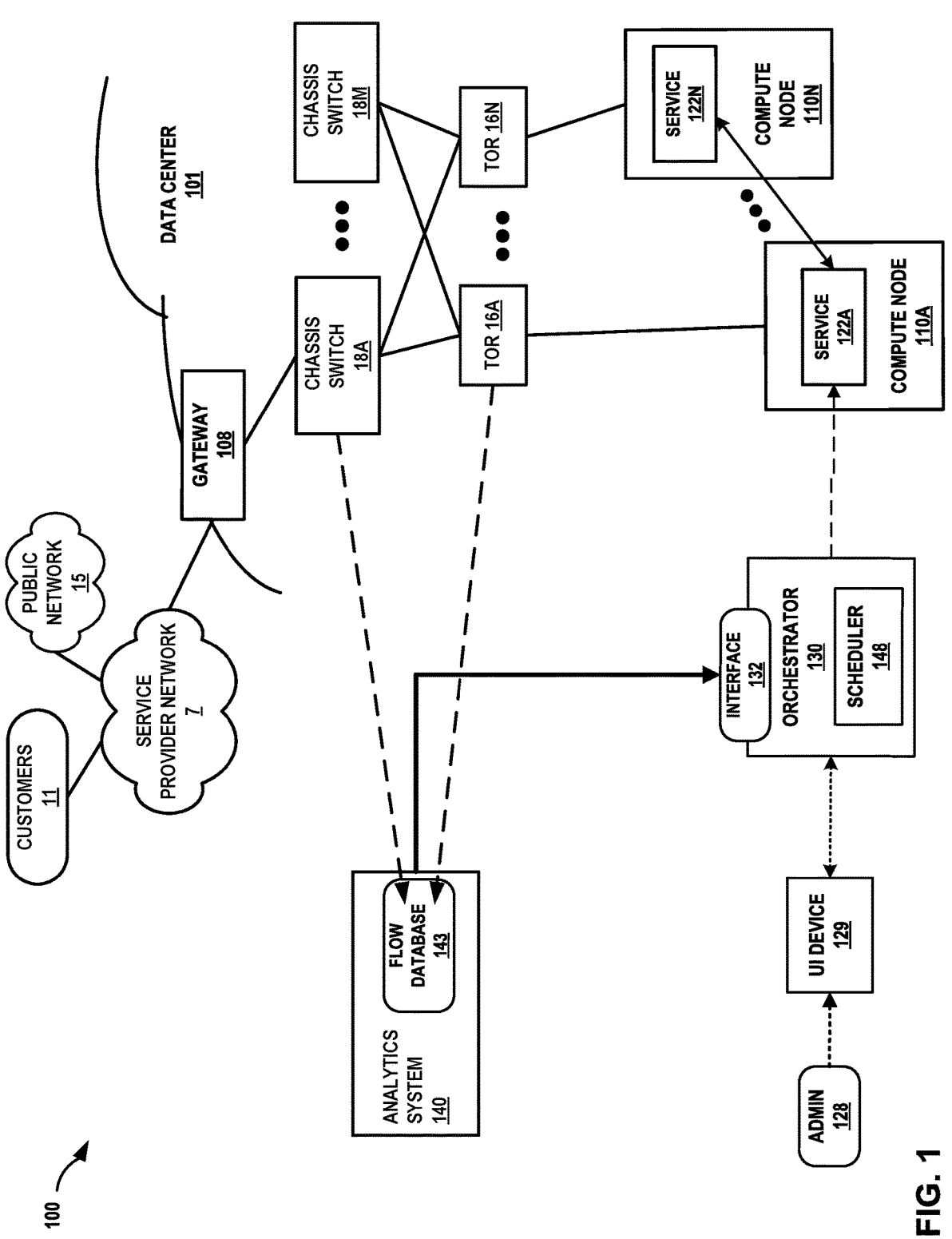
FIG. 1 is a block diagram illustrating an example computing infrastructure in which examples of the techniques described herein may be implemented.

FIG. 1 is a block diagram illustrating an example computing infrastructure 100 in which examples of the techniques described herein may be implemented. In general, data center 101 provides an operating environment for applications and services for customer sites 104 (illustrated as "customers 104") having one or more customer networks coupled to the data center by service provider network 106. Data center 101 may, for example, host infrastructure equipment, such as networking and storage systems, redundant power supplies, and environmental controls. Service provider network 106 is coupled to public network 115, which may represent one or more networks administered by other providers, and may thus form part of a large-scale public network infrastructure, e.g., the Internet. Public network 115 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 106, an enterprise IP network, or some combination thereof.

Although customer sites 104 and public network 115 are illustrated and described primarily as edge networks of service provider network 106, in some examples, one or more of customer sites 104 and public network 115 may be tenant networks within data center 10 or another data center. For example, data center 101 may host multiple tenants (customers) each associated with one or more virtual private networks (VPNs), each of which may implement one of customer sites 104.

Service provider network 106 offers packet-based connectivity to attached customer sites 104, data center 101, and public network 115. Service provider network 106 may represent a network that is owned and operated by a service provider to interconnect a plurality of networks. Service provider network 106 may implement Multi-Protocol Label Switching (MPLS) forwarding and in such instances may be referred to as an MPLS network or MPLS backbone. In some instances, service provider network 106 represents a plurality of interconnected autonomous systems, such as the Internet, that offers services from one or more service providers.

In some examples, data center 101 may represent one of many geographically distributed data centers in which the techniques and systems described herein may be implemented. As illustrated in the example of FIG. 1, data center 101 may be a facility that provides network services, cloud services, storage services, and/or application services for customers. Data center 101 may represent an on-premises data center, a private cloud, a public cloud, a hybrid cloud, or other type of deployment. A customer of the service provider may be a collective entity such as enterprises and governments or individuals. For example, a data center may host web services for several enterprises and end users. Other exemplary services may include data storage, virtual private networks, traffic engineering, file service, data mining, scientific- or super-computing, and so on. Although illustrated as a separate edge network of service provider network 106, elements of data center 101 such as one or more physical network functions (PNFs) or virtualized network functions (VNFs) may be included within the service provider network 106 core.

Switch fabric 121 may include interconnected top-of-rack (TOR) (or other "leaf") switches 16A-16N (hereinafter "TOR switches 16) coupled to a distribution layer of chassis (or "spine" or "core") switches 18A-18N (hereinafter "chassis switches 18"). Although not shown, data center 101 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 101 may also include one or more physical network functions (PNFs) such as physical firewalls, load balancers, routers, route reflectors, broadband network gateways (BNGs), Evolved Packet Cores or other cellular network elements, and other PNFs.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Any server of data center 101 may be configured with workloads by virtualizing resources of the server to provide an isolation among one or more processes (applications)

executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker-.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

In the example of FIG. 1, data center 101 includes storage and/or compute servers interconnected by one or more tiers of physical network switches and routers, with compute nodes 110A-110N (herein, "compute nodes 110") depicted as interconnected via TOR switches 16 and chassis switches 18. Compute nodes 110 may be bare metal machines and/or virtual machines within data center 101 and may also be referred to herein as "hosts" or "host devices." Compute nodes 110 may represent a computing device, such as an x86 processor-based server, configured to operate according to techniques described herein.

Compute nodes 110 may host virtual network endpoints for one or more virtual networks that operate over the physical network provided by TOR switches 16 and chassis switches 18. Although described primarily with respect to a data center-based switching network, other physical networks, such as service provider network 7, may underlay the one or more virtual networks.

Each of compute nodes 110 may host one or more workloads. The term "workload" encompasses virtual machines, containers, Kubernetes Pods, and/or other virtualized computing resources that provide an at least partially independent execution environment for applications. As shown in FIG. 1, compute node 110A hosts a workload that implements service 122A. However, a compute node 110 may execute as many workloads as is practical given hardware resource limitations of the compute node 110.

Computing infrastructure 100 implements an automation platform for automating deployment, scaling, and operations of workloads across compute nodes 110 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing workloads and/or applications and services executing on such workloads to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 100 include at least compute nodes 110, orchestrator 130, telemetry collector 142, analytics system 140, and UI device 129. Workloads may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily workload hosting devices of a cluster. For example, the Kubernetes platform uses the terms "cluster master" and "minion nodes," while the Docker Swarm platform refers to cluster managers and cluster nodes.

Orchestrator 130 implements a scheduler 148 for the computing infrastructure 100. Orchestrator 130 may be a distributed or centralized application that executes on one or more computing devices of a computing system. Orchestrator 130 may implement respective master nodes for one or more clusters each having one or more minion nodes implemented by one or more servers of computing infrastructure 100.

In general, orchestrator 130 controls the deployment, scaling, and operations of workloads across clusters of servers and providing computing infrastructure, which may include container-centric computing infrastructure. Orchestrator 130 may implement respective cluster masters for one or more Kubernetes clusters. As an example, Kubernetes is a container management platform that provides portability across public and private clouds, each of which may provide virtualization infrastructure to the container management platform. Orchestrator 130 may represent any of the above-listed orchestration platforms, e.g., Kubernetes.

Each of services 122A-122N (collectively, "services 122") is deployed using a workload. Services 122 may each represent or include one or more containers deployed by a container orchestration system. One or more of services 122 may collectively implement a distributed application that includes a collection of one or more services 122. For example, a distributed application may include services 122A-122N. Each of services 122 may provide or implement one or more services, and where services 122 represent Pods or other container deployments, the one or more services are containerized services or "microservices". Compute nodes 110 may host services for multiple different distributed applications. In some examples, services of a distributed application are distributed across compute nodes managed by any combination of service providers, enterprises, or other entities. Such compute nodes may be located in multiple different data centers, on-prem, or in private, public, or hybrid clouds.

Orchestrator 130 includes scheduler 148 to schedule services 122 to compute nodes 110. In general, scheduler 148 may manage the placement of each of services 122 to compute nodes 110 according to scheduling policies, the amount of resources requested for the service, and available resources of compute nodes 110. Compute node resources considered by the scheduler 148 when assigning services 122 to compute nodes 110 include CPU-related resources (e.g., cores, CPU/core utilization), memory-related resources (available main memory, e.g., 2 GB), ephemeral storage, and user-defined extended resources. In Kubernetes, the scheduler is known as kube-scheduler.

Services 122 may have distinct performance requirements that need to be met within a highly dynamic application execution environment. In such an environment, application performance is the artifact of dynamics of different resources such as worker node resources; network resources (e.g., bandwidth, latency, loss, jitter, firewall policies), network policies, and the communication graph among different services of a distributed application; as well as the performance of external services such as authentication and external cloud services.

Services 122 may communicate with each other as part of providing functionality for a distributed application. Each service of service 122 may provide functionality for one or more components of a distributed application. For example, service 122A may provide functionality for one part of the distributed application, while service 122N provides functionality for a different part of the distributed application.

Services 122 may communicate with each other using calls, such as remote procedure calls (RPCs). Services 122 may communicate with each other along a chain of RPCs to provide the functionality of the distributed application. For example, service 122A may communicate with service 122N and send RPCs to service 122N as part of providing functionality of the distributed application.

Services 122 may call each other in a path of service calls. For example, service 122B may call service 122C, which then calls service 122F. As part of providing the functionality of a distributed application, a series of services may call each other in turn. In some cases, service 122A is an entry endpoint service, service 122N is a terminating endpoint service, and one or more other services are called between service 122A and service 122N for an end-to-end call path for the distributed application.

A service request arriving at an entry point (aka end-point) in distributed system undergoes multiple "hops" through numerous microservice operations before being fully serviced. The life of a request results in complex microservice interactions. These interactions are deeply nested, asynchronous, and invoke numerous other down-stream operations. As a result of this complexity, it may be very hard to identify which underlying service(s) contribute to the overall end-to-end latency experienced by a top-level request.

Analytics system 140 may execute as an application on or more devices or of data center 101. Analytics system 140 may consume network information such as network telem-etry obtained by telemetry collector 142, and network flow information obtained from chassis switches 18 and TOR switches 16.

Flow database 143 may be a database maintained by analytics system 140 and stored to storage media. Analytics system 140 may store data regarding network flows that represent, in some cases, RPC call flows between pairs of services 122. In addition, analytics system 140 may store one or more maps of service dependencies and network configurations in flow database 143. Flow database 143 may include sFlow or other flow records provided by switches 16, 18 and that indicate flows processed by each of the switches, for instance over a time period. Each flow record may include a switch identifier, source IP information, destination IP information, a number of packets, a number of bytes, action taken, or other flow description data.

Analytics system 140 may utilize application trace tools to determine call paths among services 122. For example, analytics system 140 may utilize an application tracing toolkit such as OpenTelemetry and application tracing tool such as Jaegar to acquire tracing data of calls among services 122. The application tracing toolkit may use tools such as APIs integrated into services 122 and services 122 instru-mented or built using a software development kit (SDK) of the application tracing toolkit. The application tracing pro-gram may obtain data from the instrumented services of services 122. Analytics system 140 may use an application trace tool such as Jaegar to analyze the trace data generated by the tracing toolkit and determine the call paths between services 122.

Analytics system 140 may use the application trace tool to determine a critical path of one or more call paths of services 122 that underpin a distributed application. For example, a distributed application consists of large number of commu-nicating services. A distributed application includes an entry endpoint service which results in execution of multiple dependent call paths among services 122 that end at termi-nating endpoint service. Each of the intermediate steps involve an RPC call which can be a synchronous or an asynchronous call. Each step has latency cost associated with it, which may include latency due to computation and due to network delays. There are certain call paths in the computation Directed Acyclic Graph (DAG) that are rela-tively most costly and as a result may acts as a bottleneck path that determines end-to-end application performance. Analytics system 140 may use the application trace tool to determine a DAG that determine a set of nodes in the call paths that are on the critical call path. Analytics system 140 may determine the critical call path is the call path of a plurality of call paths that has the highest end-to-end latency of the plurality of call paths. Analytics system 140 may determine multiple call paths of interest, however.

Analytics system 140 may determine network paths tra-versed by calls in the critical call path. Analytics system 140 may use flow data maintained in flow database 143 to determine each network path that corresponds to a pair of adjacent services in the critical call path. For example, analytics system 140 may identify the IP addresses of a pair of services along the critical call path and determine, based on the flow data in flow database 143, which network devices such as TOR switches 16 and chassis switches 18 have processed flows sourced by/destined to IP addresses that identify the pair of services. Each service 122 may have one or more services instances that execute one or more compute nodes 110.

Each service instance is identifiable in flow data using a physical IP address of the compute node the service is deployed to, the virtual IP addresses for the workload for the service instance, or a combination of the physical IP address and the virtual IP address. The physical IP address and virtual IP address are both IP information for the service. Analytics system 140 may determine, for each pair of services 122 in the critical path, a set of source and desti-nation IP information, where the source IP information is for a caller service (e.g., send RPC calls) of each pair of adjacent services and the destination IP information is for the callee service (e.g., receives RPC calls and provides RPC responses) of each pair of adjacent services. Analytics system 140 may correlate the call path to a corresponding network path based on the source and destination IP infor-mation included in the flow database 143. Analytics system 140 may use the information regarding which network devices have processed flows corresponding to the critical call path to determine the underlying network devices of the critical call path. For example, analytics system 140 may determine that a network path from service 122A to service 122N traverses TOR switch 16A, chassis switch 18M, and TOR switch 16N because each of these switches has pro-vided flow data to flow database 143 that indicates, based on the flow data indicating source IP information for service 122A and destination IP information for service 122N, that the switches have processed an RPC flow from service 122A to service 122N.

Analytics system 140 may obtain IP information for services 122 from orchestrator 130. Scheduler 148 of orchestrator 130 causes orchestrator 130 to deploy services 122 to compute nodes 110. Orchestrator 130 implements interface 132, by which analytics system 140 may obtain IP information for any of services 122. IP information for a service can include IP information for each instance of the service.

Analytics system 140 may obtain and analyze perfor-mance metrics of network devices underlying the critical call path. Analytics system 140 may obtain data such as bandwidth, latency, transmission time, resource utilization, and other data from the network devices, such as chassis switches 18 and TOR switches 16. In addition, analytics system 140 may determine the performance metrics by correlating the performance of a network path between a pair of services with the RPC call between the pair of services. For example, analytics system 140 may determine the latency of a network path between a pair of services based on the latency of an RPC call between the pair of services.

Analytics system 140 may analyze the performance met-rics and determine whether one or more of the performance metrics satisfy or meet one or more of thresholds of perfor-mance metrics. For example, analytics system 140 may determine that the latency of TOR switch 16A satisfies a performance threshold for latency of network devices. In some examples, analytics system 140 may determine that all of the network devices in a first network path associated with a first pair of adjacent services in the critical call path are operating normally. Analytics system 140, based on the determination that the network devices are operating normally, analyzes the network path between a next pair of adjacent services within the critical call path. In another example, analytics system 140 determines that all of the network devices of the call paths between pairs of services for the critical call path are operating normally. Analytics system 140, based on the determination, identifies a second critical call path and analyzes the network devices of the second critical call path. In this way, analytics system 140 may iterate through and process critical call paths of a distributed application to attempt to identify anomalous behavior in the network having a significant effect on performance of the distributed application.

Analytics system 140, based on a performance indicator for a network device meeting a threshold, provides an indication of the anomalous behavior of the network device to orchestrator 130 via interface 132. Analytics system 140 may provide the indication to orchestrator 130 for orchestrator 130 to perform remedial action. Analytics system 140 may provide an indication that includes information identifying the network device experiencing the network path, the call path, and the network device that meets the threshold/is experiencing anomalous behavior.

As noted above, orchestrator 130 orchestrates the placement of workloads to compute nodes 110, the workloads includes services 122. For example, orchestrator 130 may orchestrate the placement of services 122 of a distributed application to one or more compute nodes 110. Orchestrator 130, responsive to receiving an indication from analytics system 140 may cause scheduler 148 to adjust the scheduling of one or more services of services 122 to redeploy the service to a different compute node from the compute node on which the service is currently executing.

For example, orchestrator 130, based on receiving an indication from analytics system 140, may cause scheduler 148 to re-schedule a service of the pair of services whose network path traverses a network device experiencing anomalous behavior. For example, orchestrator 130 receives an indication that a network device underlying a network path between a pair of services 122 is experiencing anomalous behavior. Orchestrator 130 may identify one of compute nodes 110 to reassign one the services to such that the network path between the pair of services does not traverse the network device experiencing anomalous behavior. In another example, orchestrator 130, based on receiving the indication, identifies another instance of one of the services of the pair of services 122 executing on a different compute node 110. In yet another example, orchestrator 130 may reconfigure one or more network devices to reroute the network path around the network device experiencing anomalous behavior.

Distributed applications may consist of multiple services communicating over the network to accomplish the desired task. This results in complex set of dependent RPC calls during the execution of the application. The end-to-end performance of the application thus gets determined by the performance of these service call chains. There are few RPC call chains that contributes towards maximum latency for the end-to-end behavior and can be treated as critical paths for the application. Given that in distributed system many of these call chains need to traverse the underlying network, network latency can be one of the key contributing factors for the latency of these call chains. The techniques of this disclosure provide a framework to quickly correlate application critical path performance with the underlying network. This framework is a highly scalable solution that focuses on network impact on the application critical path for large scale highly distributed applications.

The techniques of this disclosure may provide one or more technical advantages. For example, the techniques of this disclosure enable a computing system to identify bottlenecks in the performance of a distributed application that result from impacted performance of service calls between services of the distributed application. The techniques of this disclosure further enable the computing system to use call paths between pairs of services and network path information to identify network devices that are experiencing anomalous behavior and impacting the performance of the service calls between pair of services. Through leveraging information of the call paths and corresponding network paths, the techniques may enable faster diagnosis of distributed application performance.

Figure 2:
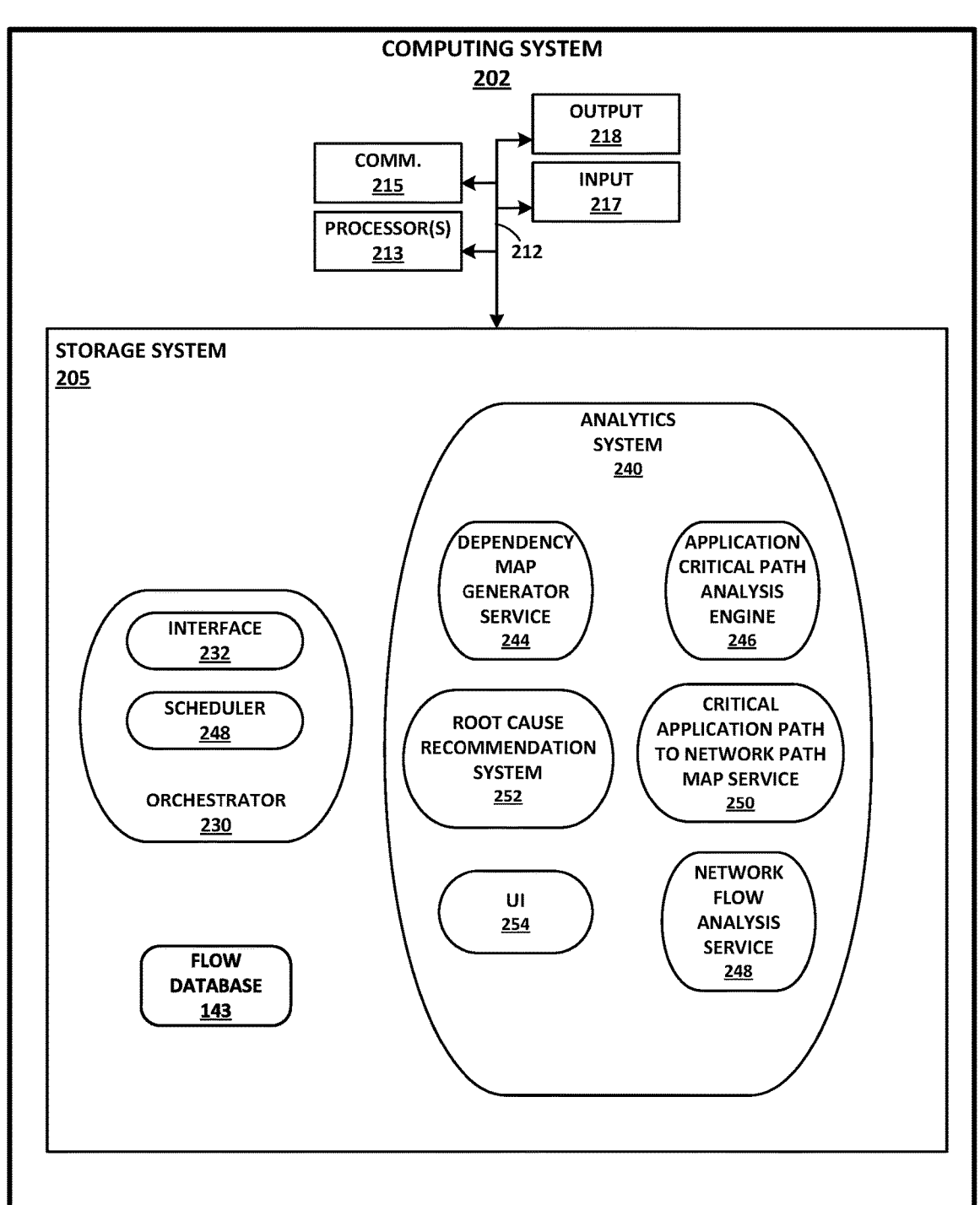
FIG. 2 is a block diagram illustrating an example computing system, in accordance with techniques described in this disclosure.

FIG. 2 is a block diagram illustrating an example computing system, in accordance with techniques described in this disclosure. Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more processor(s) 213, communication units 215 (illustrated as COMM. 215), one or more input devices 217, one or more output devices 218, and one or more storage devices of storage system 205. Storage system 205 includes analytics system 240 and orchestrator 130. One or more of the devices, modules, storage areas, or other components of computing system 202 may be interconnected to enable inter-component communications (physically, communicatively, and/or operatively). In some examples, such connectivity may be provided by through communication channels which may represent one or more of a system bus, a network connection, an inter-process communication data structure, or any other method for communicating data.

One or more of processor(s) 213 may implement functionality and/or execute instructions associated with computing system 202 or associated with one or more modules illustrated herein and/or described below. One or more of processor(s) 213 may be, may be part of, and/or may include processing circuitry that performs operations in accordance with one or more aspects of the present disclosure. Examples of processor(s) 213 include microprocessors, application processors, display controllers, auxiliary processors, one or more sensor hubs, and any other hardware configured to function as a processor, a processing unit, or a processing device. Computing system 202 may use one or more processor(s) 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Such communications may adhere to, implement, or abide by appropriate protocols, including Transmission Control Protocol/Internet Protocol (TCP/IP), Ethernet, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 205 within computing system 202 may store information for processing during operation of computing system 202. Storage system 205 may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and storage system 205 may retrieve, store, and/or execute the instructions and/or data of one or more applications, modules, or software. Processors 213 and/or storage devices of storage system 205 may also be operably coupled to one or more other software and/or hardware components, including, but not limited to, one or more of the components of computing system 202 and/or one or more devices or systems illustrated as being connected to computing system 202.

Processors 213 may execute analytics system 240. Analytics system 240 may be an application, platform, or other form type of process configured to analyze call paths among services of a distributed application executing across multiple compute nodes. For example, analytics system 240 may monitor the performance of various distributed applications and underlying services such as services 122 illustrated in FIG. 1.

Analytics system 240, as part of monitoring services of distributed applications, may identify call paths among services 122. Analytics system 240 may use an application tracing tool such as dependency map generator service (DMGS) 244. DMGS 244 may include one or more tracing tools and toolkits such as Jaegar or OpenTelemetry. DMGS 244 may instrument the distributed application that includes services 122 and obtain call pathing information for a given time window. DMGS 244 may use the call pathing information to determine call paths among services 122.

Analytics system 240 executes application critical path analysis engine (ACPAE) 246. ACPAE may be an application module, plugin, standalone service called by analytics system 240, or other components or service of analytics system 240. ACPAE 246 may determine a critical call path from a plurality of call paths identified by analytics system 240.

ACPAE 246 may determine a critical call path based on dependency graph of the plurality of call paths for a distributed application. For example, ACPAE 246 may determine a critical call path based on a DAG that includes a plurality of call paths for a particular distributed application. ACPAE 246 may determine the critical call path based on an end-to-end latency of the call paths. In another example, ACPAE 246 may identify a critical call path that is acting as a bottleneck for the performance of the distributed application. ACPAE 246 may determine the critical call path based on the latency of call paths from an entry endpoint service to a terminating endpoint service.

Analytics system 240 may execute network flow analysis service 248 (hereinafter "flow analysis 248"). Flow analysis 248 may be a module, plugin, standalone service, or other service or application. Flow analysis 248 may analyze network flow data obtained by analytics system 240 from one or more network devices such as TOR switches 16 and chassis switches 18 illustrated in FIG. 1. Flow analysis 248 may analyze the network flow data of flow database 143 to identify network paths that correspond to call paths between pairs of services. In an example, flow analysis 248 receives network data from one or more network devices. Flow analysis 248 processes the data and identifies which network devices underlie a call path between a pair of services. In some examples, flow analysis 248 may use the IP addresses of the compute nodes executing the services to determine the network path by determining which network devices have processed the IP address of the services. Flow analysis 248 may use physical IP addresses and/or virtual IP addresses to determine whether one or more network devices have processed a network flow of a call path between a pair of services that is a part of the critical call path.

Analytics system 240 may execute critical application path to network path map service (CAP) 250. Analytics system 240 may use CAP 250 to determine the network path that correspond to call paths between services of the critical call path. CAP 250 may use flow analysis 248 to determine a network path between services of the critical call path. In an example, CAP 250 receives an indication of the critical call path from a component of analytics system 240 such as ACPAE 246. CAP 250 obtains network path information from flow analysis 248 for one or more call paths between pairs of services that comprise the critical call path. CAP 250 uses the network path information to identify the network paths of the call paths between pairs of services, and by extension, the network devices and infrastructure that underlies the call paths between the pairs of services.

Analytics system 240 executes root cause recommendation system (RCRS) 252. RCRS 252, similar to other components of analytics system 240, may be a plugin, standalone service, or other type of a process. RCRS 252, based on the identification of underlying network devices of the critical path, may determine whether one or more of the underlying network devices are experiencing anomalous behavior. RCRS 252 may determine whether a network device is experiencing anomalous behavior based on the network device meeting/satisfying one or more performance metrics.

RCRS 252 determines one or more performance metrics for network devices based on one or more factors. RCRS 252 may determine the performance metrics for a network device by mapping the performance of a call path between services of the critical call path to the corresponding network path. RCRS 252, based on mapping the call path performance to the network path performance, may determine whether a network device in the network path is experiencing anomalous behavior. In an example, RCRS 252, based on mapping the performance of a call path to a network path, determines that a TOR switch within the network path is experiencing substantial latency and slowing the call path between services.

RCRS 252 determines whether one or more network devices that underlie a call path between services of the critical call path meet one or more performance thresholds that may indicate anomalous behavior. For example, RCRS 252 may determine one or more performance metrics for each network device such as latency, transmission time, bandwidth, resource utilization of network device, and other performance metrics. RCRS 252 may determine whether one or more of the performance metrics satisfy one or more performance thresholds for the network device. In an example, RCRS 252 determines that a particular TOR switch with a maximum allowable latency of 30 ms is experiencing an average latency of 55 ms. RCRS 252 determines that as the latency of the particular TOR switch satisfies the latency threshold, the particular TOR switch is experiencing anomalous behavior. RCRS 252, based on determining that a network device satisfies a performance threshold, may provide an indication to orchestrator 230 via interface 232 to redeploy services 122 for service pairs of a critical call path having communications that traverse that TOR switch.

One or more processors 213 or computing system 202 execute orchestrator 230. Orchestrator 230 may be a distributed or centralized application that implements master nodes for one or more clusters having one or more minion nodes implemented by servers of a computing infrastructure such as computing infrastructure 100 illustrated by FIG. 1. Orchestrator 230 may orchestrate the placement of services to compute nodes within computing infrastructure 100. Orchestrator 230, responsive to receiving an indication from analytics system 240, may conduct one or more remedial actions. Orchestrator 230 may take remedial actions such as re-scheduling a workload from one compute node to a different compute node such that a network path between the two compute nodes does not traverse the network device that is experiencing anomalous behavior. Orchestrator 230 may take remedial action such as redirecting a call path to end at a different instance of service that is executing on a different compute node. In example, a Service A calls a Service B over a network path that includes a network device experiencing anomalous behavior. Orchestrator 230, responsive to an indication from analytics system 240, causes Service A to call a different instance of Service B that is executing on a different compute node and avoid traversing the network device that is experiencing anomalous behavior via the call path. Orchestrator 230 may execute on a separate computing system from analytics system 240.

Analytics system 240 may execute UI 254. Analytics system 240, in addition to providing an indication to orchestrator 230, may provide an alert to a user via UI 254. UI 254 may generate user interfaces that include one or more visual elements. For example, UI 254 may generate a user interface that includes one or more visual elements, with each visual element associated with one or more services and network devices. In another example UI 254 may generate a user interface that includes a visual representation of a DAG of the network infrastructure. In yet another example, UI 254 may generate a user interface that includes a visual element associated with an alert indicating that a network device underlying the critical path is experiencing anomalous behavior.

Analytics system 240 may output a user interface via output devices 218. Analytics system 240 may output a user interface generated by UI 254 for display to a user. For example, UI 254 may generate a user interface cause output devices 218 to display a user interface that includes a visual indicator of an alert regarding a device experiencing anomalous behavior. In another example, UI 254 may generate a user interface that includes a visual representation of a DAG of the calls between services and the underlying network infrastructure.

Figure 3A:
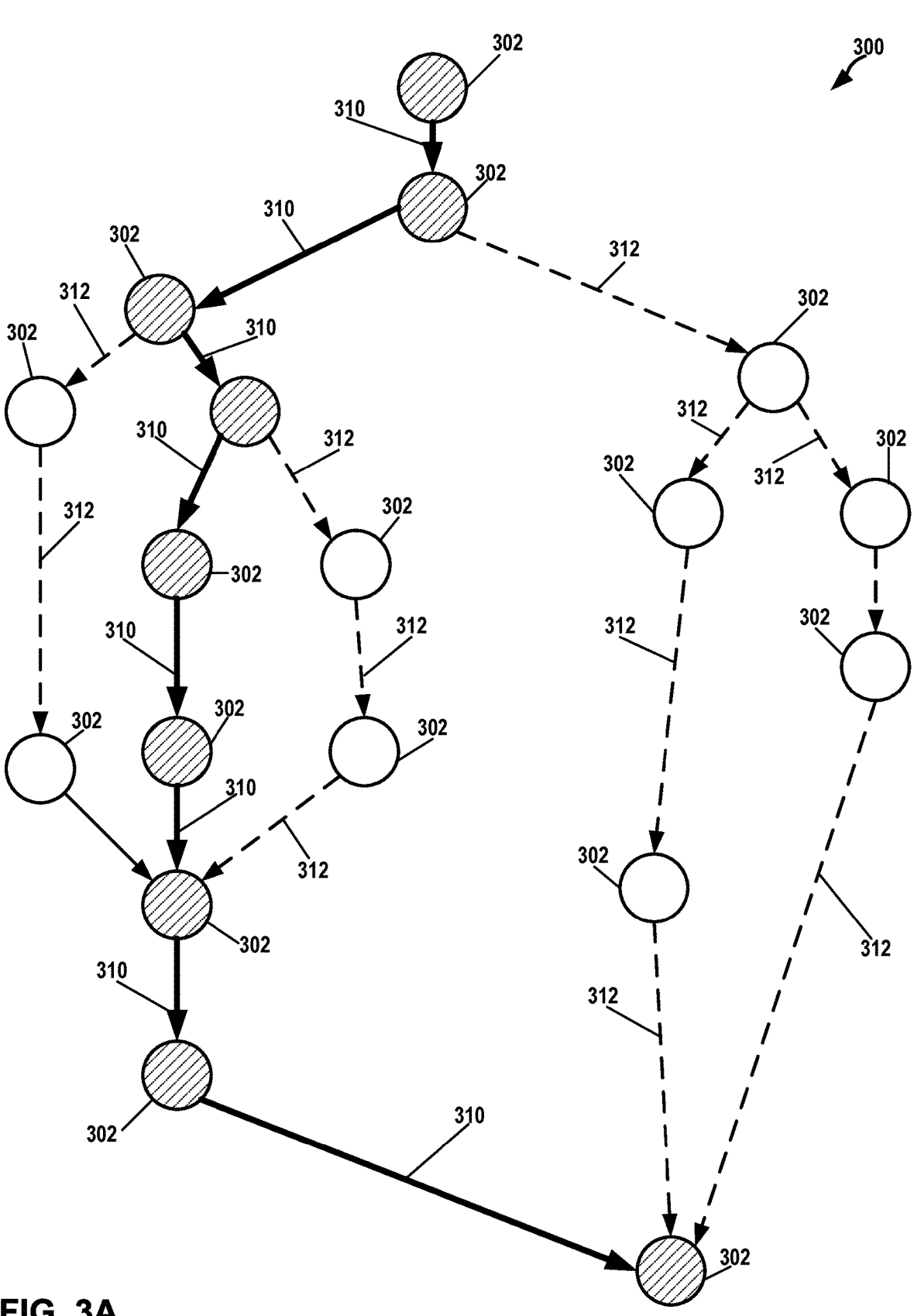
FIGS. 3A-3C are block diagrams illustrating example graphs in accordance with one or more techniques of this disclosure.
Figure 3B:
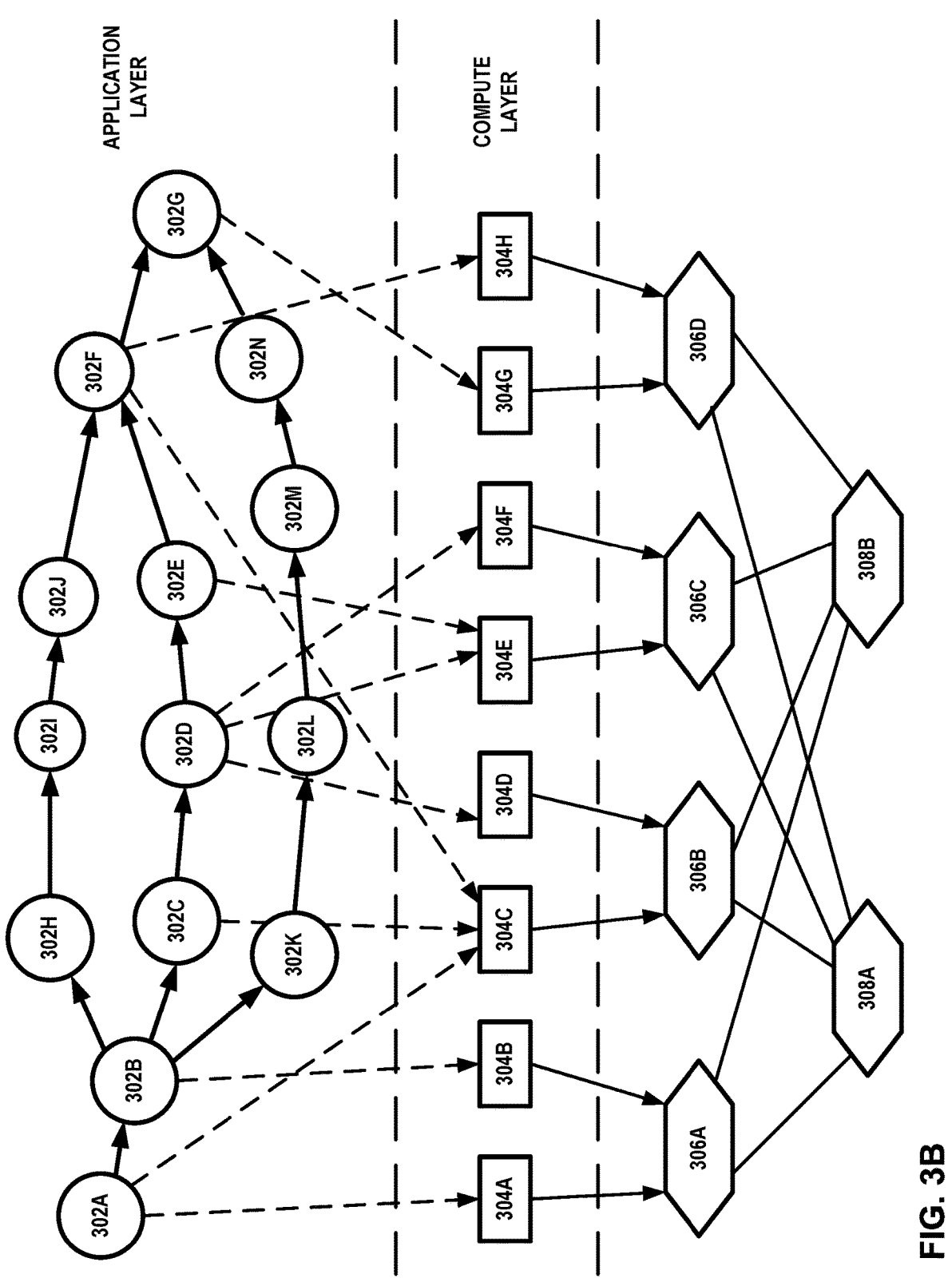
Figure 3C:
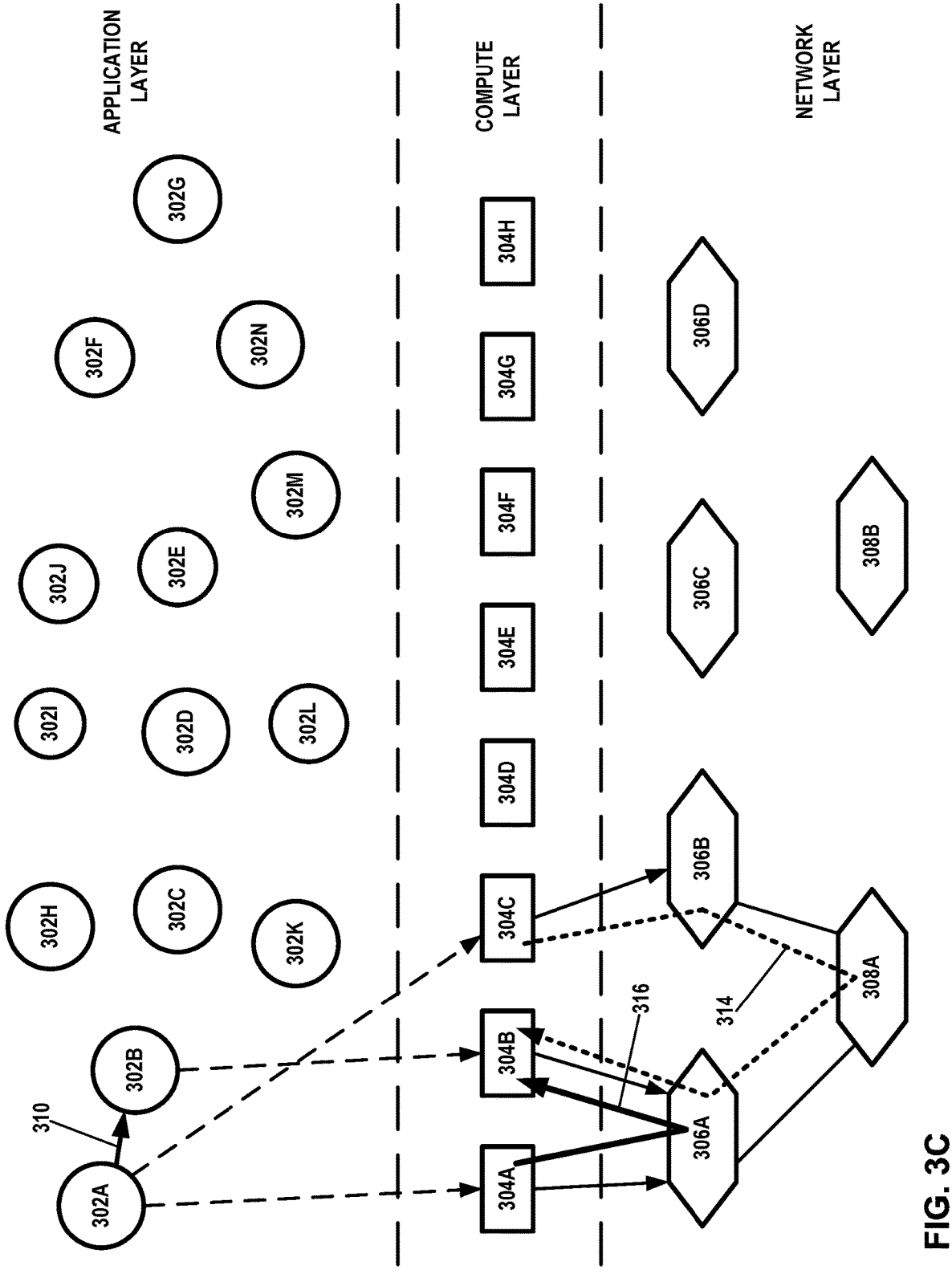

FIGS. 3A-3C are block diagrams illustrating example graphs in accordance with one or more techniques of this disclosure. FIG. 3A illustrates an example application dependency graph 300. For the purposes of clarity, FIG. 3A will be described with respect to FIG. 2.

In the example of FIG. 3A, application dependency graph 300 includes services 302. Services 302 may be services of a distributed application that call each other as part of providing the functionality of the distributed application.

Services 302 may call each other in a series of calls that form a call path. The call path results from the chains of service calls. As illustrated in FIG. 3A, services 302 call other services of services 302 via non-critical calls 310 and critical calls 312.

Analytics system 240 may use tracing tools and/or tracing toolkits to identify call paths for a distributed application. Analytics system 240 may use the tracing tools and toolkits to instrument the distributed application and determine the calls between services 302. Analytics system 240 may analyze the calls between services to derive a dependency graph of calls for the distributed application, such as graph 300. Analytics system 240 may analyze calls for a given time window and determine call paths for that call window.

Analytics system 240, for each time window, may use application communication call traces to determine the bottleneck critical paths. A critical path such as a critical call path is the chain of RPC calls that determines the end-to-end performance of the application such as response time. In the example of FIG. 3A, analytics system 240 determines call paths that include non-critical calls 310 and critical calls 312. For example, analytics system may determine one or more call paths that are not critical call paths that include non-critical calls 312 between services 302. In another example, analytics system 240 determines a critical call path that includes critical calls 310.

Analytics system 240 may generate application dependency graph 300 as a graph of calls among services for a distributed application that includes both non-critical and critical call paths. Analytics system 240 may generate application dependency graph 300 as including indicators of services that are on the critical call path (e.g., services 302 that are visually hashed in FIG. 3A).

FIG. 3B illustrates an example graph of services and underlying network infrastructure. For the purposes of clarity, FIG. 3B will be discussed with respect to FIG. 2. In the example of FIG. 3B, an analytics system such as analytics system 240 determines an application dependency graph that includes services 302A-302G (hereinafter "services 302"), compute nodes 304A-304H (hereinafter "compute nodes 304"), TOR switches 306A-306D (hereinafter "TOR switches 306"), and chassis switches 308A and 308B (hereinafter "chassis switches 308").

Analytics system 240 may identify call paths across services of services 302 at the application layer of a network infrastructure. Analytics system 240 may use an application tracing tool and toolkit such as DMGS 244 to determine calls between services of services 302 for a distributed application. For example, DMGS 244 may determine that, as illustrated in FIG. 3B, service 302A calls service 302B as part of providing the functionality of the distributed application. In another example, DMGS 244 may determine that service 302C calls service 302D, which then in turn calls service 302E.

Analytics system 240 may identify a critical call path from a plurality of call paths among services 302. Analytics system 240 may use ACPAE 246 to determine the critical call path from the call paths among services 302. ACPAE 246 may determine the critical call path by determining the call path based on the end-to-end latency of the critical path. For example, ACPAE 246 may determine that a call path that proceeds from 302A, to 302B, to 302C, to 302D, to 302E, to 302F, and terminates at 302G. In some examples, the critical path can change in different monitoring time windows.

Analytics system 240, based on determining the critical call path, determines the underlying compute nodes of the compute layer of the network infrastructure that execute the services of the critical call path, using information provided from orchestrator 230. Once critical paths are known, it is important to determine if latency bottleneck is due to the underlying network. This requires that paths for the RPC calls be determined in the network, and then correlating the performance of the network path with performance of RPC calls in the critical path. Analytics system 240 may obtain data from orchestrator 230 of services 302 that includes configuration data of services 302. For example, analytics system 240 may obtain configuration data of services 302 that includes data regarding the scheduling of services 302 to compute nodes 304. Analytics system 240 uses the data regarding the scheduling of services 302 to determine which compute nodes of compute nodes 304 executes the services of the critical call path. For example, analytics system 240 determines that compute nodes 304A and 304C each execute an instance of service 302A (as illustrated by the dotted lines from 302A to 304A and 304B in FIG. 3B). In another example, analytics system 240 determines that compute node 304C executes instances of services 302A, 302C, and 302F (as illustrated by the associated dotted lines in FIG. 3B).

Analytics system 240, based on determining the compute nodes that underlie the critical call path, determines the network paths between the compute nodes that host services of the critical call path. Each service in the critical call path may have multiple instances hosted on different compute nodes in the compute layer indicated by compute nodes 304A-304H (hereinafter "compute nodes 304"). Any RPC call between two adjacent services can be between different sender and receiver instances. Analytics system 240 may use flow analysis 248 to determine the network paths between compute nodes 304 and, by extension, the network paths between compute nodes 302 of the critical call path. Flow analysis 248 may use the IP addresses of the compute nodes that host the services of the critical call path. Flow analysis 248 may use the IP addresses of the compute nodes and determine which TOR switches 306 and chassis switches 308 have processed the IP addresses of the compute nodes.

Analytics system 240 may determine the network path that corresponds to each call between adjacent services of the critical call path. Analytics system 240 may determine network devices in the underlay fabric over which these call flows traverse. This may be achieved by collecting flow data from the network devices in the fabric layer and then querying flow database 143 for determining set of TOR switches 306 and chassis switches 308 that has observed flows corresponding to RPC calls between two adjacent services in the critical path. This is repeated for each span in the critical path. Analytics system 240 may determine, based on which network devices have observed source and destination IP addresses for a pair of services, which network devices have observed remote procedural call (RPC) flows for the call path. Analytics system 240 may use CAP 250 to determine each network path that underlies each call between services of the critical call path. In an example, service 302B calls service 302C as part of the critical call path. CAP 250 determines that the network path of the call between services 302B and 302C traverses TOR switch 306A, chassis switch 308A, and TOR switch 306B. In another example, CAP 250 determines that the network path between service 302C and an instance of service 302D executing on node 304D traverses TOR switch 306B. ToR switches 306 and chassis switches 308 may be similar to ToR switches 16 and chassis switches 18 of FIG. 1.

Once critical application paths are mapped to the underlay or overlay network paths as shown above, then it will be possible to determine which specific path or sub-path in the network is having the greatest impact on the application RPC calls in the critical path. In order to determine router that impacts maximum number of service spans aka RPC calls. For an example, chassis switch 308A performance may impact 3 spans: [302A-302B], [302B-302C], [302F-302G]. If chassis switch 308A's key KPIs, such as interface packet loss or error rates, show anomalous behavior in the monitoring window T, then there is high likelihood that performance of critical path spans (302A-302B, 302B-302C, 302F-302G) is being impacted by the network during that time window. In case there are no issues observed based on chassis switch 308A KPIs, then the same correlation analysis is performed with the next set of network devices in the decreasing order of number of impacted spans. If none of the correlations determines causality of network path performance with the critical path performance, then that can assist the operator with excluding the network as a bottleneck for the application performance degradation. Analytics system 240 may use RCRS 252 to determine whether one or more of the network devices that underlie the network path are experiencing anomalous behavior. RCRS 252 may correlate the performance of a call between services to the underlying network path. For example, RCRS 252 may correlate the performance of a call from service 302B to service 302C to the network path between service 302B and service 302C to determine the performance of the network path. RCRS 252, based on the correlation of the call performance to the underlying network path, determines performance metrics of the network devices of the network path. RCRS 252 may determine performance metrics such as latency, transmission time, bandwidth, resource utilization, and other performance metrics. RCRS 252, based on determining the performance metrics, determines whether one or more performance metrics satisfy one or more performance thresholds. For example, RCRS 252 may determine that a latency of TOR switch 306A satisfies a performance threshold for latency.

Analytics system 240, responsive to RCRS 252 determining that a performance threshold has been satisfied for a least one network device underlying the network path, may in some cases directs orchestrator 230 to remediate the network path by redeploying services. Orchestrator 230, in response, determines one or more actions to remediate the performance of the critical call path. In an example, analytics system 240 determines that TOR switch 306C is experiencing anomalous behavior and is impacting the performance of the critical call path by slowing calls between service 302C executing on compute node 304C and service 302D executing on compute node 304E. Analytics system 240 provides an indication to orchestrator 230 to remediate the calls between service 302C and service 202D. Orchestrator 230, responsive to the indication, modifies the calls between services 302C and 302D such that service 302C calls the instance of service 302D executing on compute node 304D instead of the instance of service 302D executing on compute node 304E to avoid traversing TOR switch 306C. In another example, orchestrator 230 may identify a replacement service for either service of the services of the pair of adjacent services, where the replacement service is another instance of either service of the services of the pair of adjacent services executing on a different compute node. Orchestrator 230 may reconfigure the distributed application to execute using the replacement service instead of one of either service of the pair of adjacent service.

FIG. 3C illustrates an example graph of application dependencies. For purposes of clarity, FIG. 3C will be described with respect to FIG. 2. FIG. 3C is a simplified representation of FIG. 3B and illustrates an example call path between service 302A and service 302B, along the underlying network paths between instances of those services. In the example of FIG. 3C, service 302A calls service 302B as part of providing the functionality of a distributed application. Service 302A calls service 302B using service call 310.

Analytics system 240 may determine the network paths that correspond to service call 310. Analytics system may use data from orchestrator 230 to identify the compute nodes that execute services 302A and 302B. In the example of FIG. 3C, analytics system 240 may determine that compute nodes 304A and 304C execute instances of service 302A and that compute node 304B executes an instance of service 302B.

Analytics system 240 determines the network paths that transport service call 310. Analytics system 240 may use the source and destination IP information for services 302A and 302B and determine which network devices process flows that include the source and destination IP information for instances of services 302A and 302B, respectively.

Analytics system 240 may determine that there is more than one network path for a particular service path. Analytics system 240 may determine that, due to multiple instances of one or more services executing on different compute nodes, there are multiple network paths. For example, analytics system determines that in the case of service 302A executing on compute node 304A, the network path of service call 310 starts at compute node 304A, traverses TOR switch 306A, and is received by service 302B hosted at compute node 304B. In another example, service 302A executes on compute node 304C. Service call 310 starts at compute node 304C, traverses TOR switch 306B, chassis switch 308A, and TOR switch 306A, and is received by service 302B hosted at compute node 304B.

Analytics system 240 may provide an indication to orchestrator 230 to remediate a critical call path by remediating service call 310. Analytics system 240 may provide an indication to orchestrator 230 that includes information about the network path of service call 310.

Orchestrator 230 may remediate the network path of service call 310 to avoid traversing the network device that is experiencing anomalous behavior. Orchestrator 230 may remediate the network path of service call 310 by re-scheduling a service of service path 310 to a different compute node and avoid traversing a network device that is experiencing anomalous behavior. Orchestrator 230 may also cause a service of service call 310 to call a different instance of a service executing on a different compute node to avoid traversing the network device that is experiencing anomalous behavior. Orchestrator 230 may also cause the distributed application to use a different entry service to avoid traversing the network device. For example, orchestrator 230 may cause the distributed application to use the instance of service 302A that executes on compute node 304C instead of the instance of service 302A that executes on compute node 304A. In another example, analytics system 240 determines that chassis switch 308A, which network path 314 traverses from compute node 304C to compute node 304B is experiencing anomalous behavior. Analytics system 240, responsive to the determination, provides an indication to orchestrator 230 to remediate service call 310. Orchestrator 230 causes the distributed application to use the instance of service 302A that executes on compute node 304A instead of the instance of service 302A that executes on compute node 304C as the entry service. As a result, service call 310 traverses network path 316 instead of network path 314.

FIG. 4 is a flowchart illustrating an example operation of the computing system in accordance with one or more techniques of this disclosure. For the purposes of clarity, FIG. 4 will be discussed in the context of FIG. 1.

A computing system, such as analytics system 140, determines, for a distributed application implemented with a plurality of services, such as services 100, executing on compute nodes, such as compute nodes 110, interconnected by a network of network devices, a call path from an entry endpoint service of the plurality of services to a terminating endpoints service of services 122 (402). Analytics system 140 may determine the call path for the distributed application that includes multiple services that form a chain of calls that is the call path. To determine the call path, analytics system 140 use a tracing tool and/or tracing toolkit. For example, analytics system 140 may determine the call path using a tracing tool that instruments services 122 and traces call among services 122.

Analytics system 140 determines a corresponding network path for each pair of adjacent services of services 122 from a plurality of a pairs of services 122 that communicate for the call path (404). Analytics system 140 may determine the corresponding network path using flow data obtained from network devices such as TOR switches 16 and chassis switches 18. For example, analytics system 140 may obtain the virtual and physical IP addresses of the compute nodes that executes services 122 and determine which network devices have seen the IP addresses of those compute nodes.

Analytics system 140, based on a performance indicator for a network device of the corresponding network path meeting a threshold, performs one or more of reconfiguring the network or re-deploying one of services 122 to a different compute node of compute nodes 110 (406). Analytics system 140 may map or correlate the performance of a service call between a pair of nodes to the performance of a network path. For example, analytics system 140 may determine that a network device is experiencing elevated latency or anomalous behavior by mapping sluggish performance of the service call between a pair of services to a network device that underpins or underlies the connection between those services. Analytics system 140 may analyze performance metrics of network devices such as latency, transmission time, bandwidth, resource utilization, availability of labels such as MPLS labels, and other performance metrics. Analytics system 140 may compare the performance metric to one or more thresholds that are predetermined or are dynamically adjusted based on network and performance requirements. Analytics system 140, based on determining that a performance indicator meets/satisfies the performance threshold, may perform one or more remedial actions. Analytics system 140 may reconfigure the network and remediate the network device that meets the threshold and is experiencing anomalous behavior. Analytics system 140 may cause an orchestrator such as orchestrator 130 to reschedule or redeploy one or more of the services to different compute nodes to avoid traversing the network device. In some example, analytics system 140 may cause the distributed application to execute using a different instance of a service that is executing on a different compute node to avoid traversing the network device.

Figure 5:
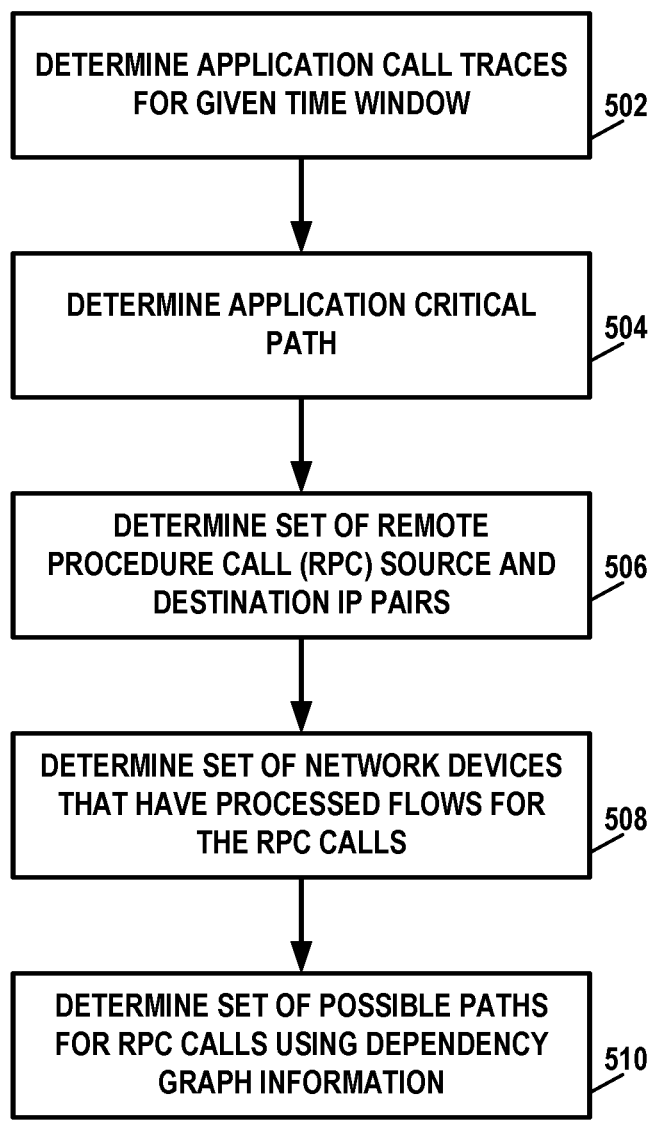
FIG. 5 is a flow diagram illustrating an example operation of the computing system in accordance with one or more techniques of this disclosure.

FIG. 5 is a flow diagram illustrating an example operation of the computing system in accordance with one or more techniques of this disclosure. For the purposes of clarity, FIG. 5 will be discussed in regard to FIG. 1.

An analytics system, such as analytics system 140, determines application call traces for a given time window (502). Analytics system 140 may use application tracing tools and/or toolkits such as Jaegar and OpenTelemetry to acquire application call traces. Analytics system 140 may use the application call traces to determine a call path among services of the application. Analytics system 140 may determine the call path among services of the application, where the application may be a distributed application. In the case of a distributed application, an administrator may find it challenging to determine how the performance of individual services and connections between the services impact the distributed application as a whole due to the distributed nature of the application and a myriad number of potential connections and network paths among the services of the application.

Analytics system 140 determines a critical path of the application (504). Analytics system 140 may determine a critical call path out of a plurality of call paths among services 122. Analytics system 140 may determine the critical call path by selecting the call path with the greatest latency. Analytics system 140 may determine the critical call path based on the total latency of the call path from an entry endpoint service to a terminating endpoint service.

Analytics system 140 determines a set of remote procedure call (RPC) source and destination IP pairs (506). Analytics system 140 determines virtual and/or physical IP address of the source and destination pairs of services within the critical call path. Analytics system 140 may determine the IP addresses for each source and destination pairs of services within the critical call path. For example, analytics system 140 may determine the IP addresses of four pairs of services that comprise the services within the critical call path.

Analytics system 140 determines a set of network devices that have processed (e.g., switched or forwarded) the RPC flows for the pair of source and destination services (508). Analytics system 140 may use flow data obtained from network devices within data center 101 to determine the set of network devices that processed flows for the RPC calls. For example, analytics system 140 may determine that TOR switch 16A, chassis switch 18M, and TOR switch 16N have all processed the RPC flows for a pair of services.

Analytics system 140 determines a set of possible paths for RPC calls using dependency graph information. Analytics system 140 may generate a dependency graph of the critical call path, where the dependency graph illustrates the compute nodes executing the services and the underlying network infrastructure that includes network devices such as TOR switches 16 and chassis switches 18. Analytics system 140 may use the dependency graph to correlate to flows and thereby identify network devices that are potentially impacting the performance of RPC calls between services and, by extension, the performance of the distributed application.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage media comprising instructions that, when executed, cause one or more processors to perform one or more of the methods described above. For example, the computer-readable data storage media may store such instructions for execution by one or more processors.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media. Computer-readable storage media may be distributed among multiple packages, devices, or other components capable of being configured with computer instructions.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing system, comprising:

memory; and processing circuitry in communication with the memory, and configured to:

determine, for a distributed application implemented with a plurality of services executing on compute nodes interconnected by a network of network devices, a call path from an entry endpoint service of the plurality of services to a terminating endpoint service of the plurality of services;

determine a corresponding network path traversed by corresponding calls for each pair of one or more pairs of adjacent services from a plurality of pairs of services that communicate for the call path; and for a pair of the one or more pairs of adjacent services, based on a performance indicator for a network device, of the network devices, of the corresponding network path traversed by the corresponding calls for the pair of the one or more pairs of adjacent services meeting a threshold, perform one or more of:

reconfigure the network; or redeploy one of the plurality of services to a different compute node of the compute nodes.

2. The computing system of claim 1, wherein to determine the corresponding network path, the processing circuitry is configured to:

determine, for the pair of the one or more pairs of adjacent services, a source IP address and a destination IP address, wherein the source IP address is the IP address of a caller service of the pair of the one or more pairs of adjacent services, and wherein the destination IP address is the IP address of a callee service of the pair of the one or more pairs of adjacent services; and correlate, based on the source IP address and the destination IP address, a flow to the corresponding network path.

3. The computing system of claim 2, wherein to correlate the flow to the corresponding network path the processing circuitry is configured to determine, based on flow data, one or more of the network devices that have processed flows that include the source IP address and the destination IP address.

4. The computing system of claim 2, wherein the source IP address is one of a physical IP address for a compute node that hosts the caller service or a virtual IP address for a workload for the caller service.

5. The computing system of claim 1, wherein the network devices comprise at least one top-of-rack switch and at least one chassis switch.

6. The computing system of claim 1, wherein to reconfigure the network, the processing circuitry is further configured to:

identify a replacement service for either service of the pair of the one or more pairs of adjacent services, wherein the replacement service is another instance of a first service of the pair of the one or more pairs of adjacent services executing on a different compute node; and reconfigure the distributed application to execute using the replacement service.

7. The computing system of claim 1, wherein the call path is a first call path, wherein the entry endpoint is a first entry endpoint, wherein the terminating endpoint is a first terminating endpoint, and wherein the processing circuitry is further configured to:

based on determining that no performance indicators for the network device meet the threshold, determine, for the distributed application implemented with the plurality of services, a second call path from a second entry endpoint service of the plurality of services to a second terminating endpoint service of the plurality of services;

determine a second corresponding network path traversed by corresponding calls for a different pair of the one or more pairs of adjacent services from the plurality of pairs of services that communicate for the second call path;

identify a second network device on one of the second corresponding network path; and based on a performance indicator for the second network device meeting the threshold, perform one or more of:

reconfigure the network; or redeploy one of the plurality of services to a different compute node of the compute nodes.

8. The computing device of claim 1, wherein the performance indicator is one or more of:

a packet loss rate, a transmission time, a resource utilization, or a latency.

9. The computing device of claim 1, wherein the call path is a call path of a plurality of call paths for the distributed application that has a highest end-to-end latency of the plurality of call paths.

10. A method comprising:

determining, by a computing system, for a distributed application implemented with a plurality of services executing on compute nodes interconnected by a network of network devices, a call path from an entry endpoint service of the plurality of services to a terminating endpoint service of the plurality of services;

determining, by the computing system, a corresponding network path traversed by corresponding calls for each pair of one or more pairs of adjacent services from a plurality of pairs of services that communicate for the call path; and for a pair of the one or more pairs of adjacent services, based on a performance indicator for a network device of the network devices, of the corresponding network path traversed by the corresponding calls for the pair of the one or more pairs of adjacent services meeting a threshold, performing, by the computing system, one or more of:

reconfiguring the network; or redeploying one of the plurality of services to a different compute node of the compute nodes.

11. The method of claim 10, wherein determining a corresponding network path further comprises:

determining, for the pair of the one or more pairs of adjacent services, a source IP address and a destination IP address, wherein the source IP address is the IP address of a caller service of the pair of the one or more pairs of adjacent services, and wherein the destination IP address is the IP address of a callee service of the pair of the one or more pairs of adjacent services; and correlating, based on the source IP address and the destination IP address, a flow to the corresponding network path.

12. The method of claim 11, wherein correlating the flow to the corresponding network path further comprises determining, based on flow data, one or more of the network devices that have processed flows that include the source IP address and the destination IP address.

13. The method of claim 12, wherein the source IP address is one of a physical IP address for a compute node that hosts the caller service or a virtual IP address for a workload for the caller service.

14. The method of claim 10, wherein the network devices comprise at least one top-of-rack switch and at least one chassis switch.

15. The method of claim 10, wherein reconfiguring further comprises:

identifying a replacement service for either service of the pair of the one or more pairs of adjacent services, wherein the replacement service is another instance of a first service of the pair of the one or more pairs of adjacent services executing on a different compute node; and reconfiguring the distributed application to execute using the replacement service.

16. The method of claim 15, wherein the call path is a first call path, wherein the entry endpoint is a first entry endpoint, wherein the terminating endpoint is a first terminating endpoint, and further comprising:

based on determining that no performance indicators for the network device meet the threshold, determining, by the computing system and for the distributed application implemented with the plurality of services, a second call path from a second entry endpoint service of the plurality of services to a second terminating endpoint service of the plurality of services;

determining, by the computing system, a second corresponding network path traversed by corresponding calls for a different pair of the one or more pairs of adjacent services from the plurality of pairs of services that communicate for the second call path;

identifying, by the computing system, a second network device on one of the second corresponding network path; and based on a performance indicator for the second network device meeting a threshold, perform one or more of:

reconfiguring the network; or redeploying one of the plurality of services to a different compute node of the compute nodes.

17. The method of claim 10, wherein the performance indicator is one or more of:

a packet loss rate, a transmission time, a resource utilization, or a latency.

18. The method of claim 10, wherein the call path is a call path of a plurality of call paths for the distributed application that has a highest end-to-end latency of the plurality of call paths.

19. Non-transitory computer-readable storage media comprising instructions that, when executed, cause one or more processors to:

determine, for a distributed application implemented with a plurality of services executing on compute nodes interconnected by a network of network devices, a call path from an entry endpoint service of the plurality of services to a terminating endpoint service of the plurality of services;

determine a corresponding network path traversed by corresponding calls for each pair of one or more pairs of adjacent services from a plurality of pairs of services that communicate for the call path; and for a pair of the one or more pairs of adjacent services, based on a performance indicator for a network device, of the network devices, of the corresponding network path traversed by the corresponding calls for the pair of the one or more pairs of adjacent services meeting a threshold, perform one or more of:

reconfigure the network; or redeploy one of the plurality of services to a different compute node of the compute nodes.

20. The non-transitory computer-readable storage media of claim 19, wherein the instructions further cause the one or more processors to:

determine, for the pair of the one or more pairs of adjacent services, a source IP address and a destination IP address, wherein the source IP address is the IP address of a caller service of the pair of the one or more pairs of adjacent services, and wherein the destination IP address is the IP address of a callee service of the pair of the one or more pairs of adjacent services; and correlate, based on the source IP address and the destination IP address, a flow to the corresponding network path.

* * * * *